United States Patent
Van De Laar

(10) Patent No.: US 11,861,064 B2
(45) Date of Patent: Jan. 2, 2024

(54) WEARABLE DATA INPUT DEVICE AND OPERATING METHOD

(71) Applicant: Laurens Van De Laar, Eindhoven (NL)

(72) Inventor: Laurens Van De Laar, Eindhoven (NL)

( * ) Notice: Subject to any disclaimer, the term of this patent is extended or adjusted under 35 U.S.C. 154(b) by 201 days.

(21) Appl. No.: 16/980,226

(22) PCT Filed: Mar. 11, 2019

(86) PCT No.: PCT/NL2019/050156
§ 371 (c)(1),
(2) Date: Sep. 11, 2020

(87) PCT Pub. No.: WO2019/177459
PCT Pub. Date: Sep. 19, 2019

(65) Prior Publication Data
US 2021/0034153 A1 Feb. 4, 2021

(30) Foreign Application Priority Data
Mar. 11, 2018 (NL) .................................. n12020568

(51) Int. Cl.
*A61B 5/00* (2006.01)
*G06F 3/01* (2006.01)
*G06F 3/023* (2006.01)
*G06F 3/0346* (2013.01)

(52) U.S. Cl.
CPC ............ *G06F 3/014* (2013.01); *G06F 3/0233* (2013.01); *G06F 3/0346* (2013.01); *G06F 2203/0331* (2013.01)

(58) Field of Classification Search
None
See application file for complete search history.

(56) References Cited

U.S. PATENT DOCUMENTS

| | | | |
|---|---|---|---|
| 6,413,229 B1 * | 7/2002 | Kramer | G06F 3/014 600/595 |
| 2020/0192477 A1 * | 6/2020 | Fuqua | G06F 1/163 |

* cited by examiner

*Primary Examiner* — Carl Adams
(74) *Attorney, Agent, or Firm* — Schroeder Law PC

(57) ABSTRACT

This invention relates to a wearable data input device to be worn on a human hand, comprising: —a base comprising a proximal end and a distal end opposite to the proximal end; a finger support connected to the base to receive a portion of a finger of the hand corresponding to the proximal phalanges in order to allow the corresponding finger support to carry the wearable data input device; at least one sensor arranged at the distal end of the base to interact with fingertips of the hand to allow user input; and an output unit to send data corresponding to the user input to an external device.

27 Claims, 7 Drawing Sheets

WEARABLE DATA INPUT DEVICE AND OPERATING METHOD

BACKGROUND OF THE INVENTION

The invention relates to a wearable data input device to be worn on a human hand.

A computer keyboard and mouse are currently still the most used way of providing computer input. A main disadvantage of the computer keyboard and mouse is that the user is bound to a table or other reference surface and this reference surface mainly determines the position of the human body while working or operating.

The limited mobility of the user and the frequent usage of the computer keyboard and mouse may cause injuries to neck, shoulder and wrist, commonly referred to as repetitive strain injuries. An example thereof is carpal tunnel syndrome.

There are many initiatives to solve this by providing input devices that do not require a fixed reference surface such as a table.

One such prior art input device is disclosed in U.S. Pat. No. 4,517,424. The device engages the hand of a user and maintains a fixed position while permitting movement of the fingers. Pushbuttons are provided and adapted to be operated by pivotal movements of the finger in its plane, wherein each pushbutton is engaged by a different portion of the finger.

Another such prior art input device is disclosed in WO2003/038586. The device is worn around the palm of a hand and comprises input members to be manipulated by the fingers of said hand and further input members at the back of the hand wearing the device to be manipulated by fingers of the other hand.

A further prior art input device is disclosed in U.S. Pat. No. 5,796,354. The device is worn on the hand and arm and comprises input members to be manipulated by the fingertips.

So far, the prior art wearable data input devices have not been a commercial success. The applicant is of the opinion that this is due to the prior art data input devices not being able to meet all user demands at the same time, including:
  providing all regularly used functionalities of a computer keyboard and mouse. Users want to be able to do the same or even more with a wearable data input device;
  clear and unambiguous key pressing;
  easy adjustment to operating principle of wearable data input device. The wearable data input device preferably mimics the use of a computer keyboard and mouse so that the user when using the wearable data input device for the first time can easily adjust to and learn the operating principle of the wearable data input device;
  easy to put on and off; and
  preferably allowing cursor or mouse control without having to switch to a mouse.

BRIEF SUMMARY OF THE INVENTION

In view of the above it is an object of the invention to provide a wearable data input device that meets one or more, preferably all of the user demands.

According to a first aspect of the invention, there is provided a wearable data input device to be worn on a human hand, comprising:
  a base comprising a proximal end and a distal end opposite to the proximal end;
  a finger support to receive a portion of a finger of the hand corresponding to the proximal phalanges in order to allow the corresponding finger portion to carry the wearable data input device,
  wherein the finger support is rotatably connected to the base to rotate about a rotation axis, which rotation axis is arranged to be substantially aligned with the metacarpophalangeal joint of the corresponding finger when said finger portion is received in the finger support, wherein a proximal end side of the base is configured to engage with the hand or corresponding arm at a wrist side of the metacarpophalangeal joint, wherein a set of sensors is provided at the distal end side of the base to interact with fingertips of the hand to allow user input, and wherein the input device further comprises an output unit to send data corresponding to the user input to an external device.

An advantage of the wearable data input device according to the first aspect is that the input device is easy to put on and off. The input device is mainly supported by the finger support, so that putting on and off is simply putting the finger support over the finger or removing the finger support, respectively. To provide a second support location for a stable support of the base, the proximal end of the base only needs to engage with the hand or corresponding arm at a wrist side of the metacarpophalangeal joint.

Another advantage is that although the finger support and thus the finger carries most of the weight of the input device, movement of the finger in the finger support relative to the base is still possible due to the rotation axis between finger support and base being aligned with the metacarpophalangeal joint. Fingers not received in a corresponding finger support may further be free to move in any direction possible.

A further advantage may be that inputting data can be done faster using the device according to the first aspect of the invention as switching between mouse and keyboard functions as described in more detail below can be done quicker due to the fact that no physical distance needs to be crossed by the hand or arm when moving between keyboard and mouse.

Yet another advantage may be that no table or other reference surface is needed to provide input, making this device also suitable to provide input during presentations in front of a screen, or to provide input to control a machine without a keyboard and/or mouse, etc.

It is noted here explicitly, that proximal and distal have their normal meaning as also used in medicine, meaning that—in use—the proximal end of the base is the portion of the base that is closest to the center of the body, in this case the torso and the distal end of the base is the portion of the base that is the furthest away from the center of the body, irrespective of the shape of the base. Hence, the base does not need to have an elongated shape and may for instance have a ball-like shape having a portion that is the proximal end and a portion opposite the proximal end that is the distal end within the context of this specification.

It is further explicitly noted here that the set of sensors being provided at the distal end side of the basis to interact with fingertips of the hand means that the set of sensors comprise a portion that is provided at the distal end side of the basis to allow the interaction with the fingertips to occur at the distal end side of the basis, but that other portions of the set of sensors do not necessarily have to be positioned at the distal end side of the basis and may even be positioned at the proximal end side of the base.

Hence, in an embodiment, when said finger portion is received in the finger support, an orientation of the finger support substantially follows the orientation of said finger portion during movement of the finger.

The mobility of the fingers allows that the base can be provided with a relatively large set of reachable sensors to mimic a computer keyboard. In an embodiment, the set of sensors comprises an array of four columns and three rows of sensors, where the columns extend in a direction parallel to the fingers and the rows extend perpendicular thereto. Each column may for instance be associated with one of the fingers of the hand allowing each finger to reach at least three sensors within the associated column.

In an embodiment, the array may include one or more additional columns of sensors, so that one finger is associated with two adjacent columns of sensors. This may for instance apply to the index finger and the little finger which are in general the easiest fingers to move sideways to an adjacent column. Alternatively, or additionally, the number of sensors present in a column may be adjusted to the size of the finger. Hence, for instance, the column or columns associated with the little finger may only include two sensors instead of three sensors mentioned above. The same may apply for e.g. the index finger. Hence, it is also possible that each finger is able to reach four different sensors, but the sensors associated with the index finger and/or the little finger are arranged in a 2×2 array and the sensors associated with the other fingers are arranged in a 1×4 array. Other variations and embodiments are also envisaged.

In an embodiment, two, three or four sensors are provided for the middle finger and two three or four sensors are provided for the ring finger, preferably arranged on a line extending substantially parallel to the respective finger, i.e. the column direction described above.

It is explicitly noted here that it is not necessary that sensors are associated with each finger of a hand. The invention also applies to embodiments in which one or more fingers do not have associated sensors.

In an embodiment, a center of gravity of the base is located at a distal end side of the rotation axis. In this way, when the hands are held in an often occurring orientation with the palms facing downwards, gravity will urge the proximal end of the base in engagement with the hand or corresponding arm, so that no further elements are required for this engagement and putting the device on and off is easy.

In an embodiment, the finger support is a first finger support and the rotation axis is a first rotation axis, wherein the input device further comprises a second finger support to receive a portion of another finger of the hand corresponding to the proximal phalanges in order to allow the other finger portion to carry the wearable data input device as well, and wherein the second finger support is rotatably connected to the base to rotate about a second rotation axis, which second rotation axis is arranged to be substantially aligned with the metacarpophalangeal joint of the corresponding other finger when said other finger portion is received in the second finger support.

Providing a second finger support creates a more stable support for the input device as the input device is now supported by the first and second finger support which also prevents the base from inadvertently rotating about an axis substantially parallel to the fingers.

In an embodiment, when said other finger portion is received in the second finger support, an orientation of the second finger support substantially follows the orientation of said other finger portion during movement of the other finger.

In an embodiment, the first finger support is configured for the index finger and the second finger support is configured for the ring finger. Alternatively, the second finger support is configured for the middle finger. Below, in table 1, suitable combinations of first and second finger supports and corresponding fingers are given:

TABLE 1 suitable combinations of finger supports and fingers

| Embodiment no. | First finger support | Second finger support |
|---|---|---|
| 1 | Index finger | Middle finger |
| 2 | Index finger | Ring finger |
| 3 | Index finger | Little finger |
| 4 | Middle finger | Ring finger |
| 5 | Middle finger | Little finger |
| 6 | Ring finger | Little finger |

In an embodiment, the finger support, the first finger support and/or the second finger support, if applicable, comprises a ring to receive the corresponding finger portion. Please note that in this specification, a ring not necessarily means a fully closed ring extending over 360 degrees, but also encompasses a partially open ring extending over less than 360 degrees or a extending over 360 degrees but including two ends that are not connected to each other.

In an embodiment, the finger support comprises a rigid part and an elastic part.

In an embodiment, a finger support, whether being the sole finger support or a first or second finger support, may be configured to receive a plurality of portions of a corresponding plurality of fingers of the hand corresponding to the proximal phalanges. For instance, said finger support may be an elastic strap or similar structure to be provided around the plurality of finger portions. The elasticity, although not required per se, is preferred to allow finger portions to easily move relative to each other. It is noted explicitly here that in case a finger support is configured to receive more than one finger portion, the rotation axis associated with the finger support only needs to be aligned with the metacarpophalangeal joint of one of the corresponding fingers in order to fall within the scope of the invention.

Hence, when there is a single finger support, this finger support may be configured to receive portions of one of the following combinations of fingers:
  index finger and middle finger;
  index finger, middle finger and ring finger;
  index finger, middle finger, ring finger and little finger;
  middle finger and ring finger;
  middle finger, ring finger and little finger; and
  ring finger and little finger.

Further when the input device comprises a first and second finger support, the following combinations may be possible as indicated in table 2.

In an embodiment, the set of sensors also include at least a thumb sensor to interact with the thumb of the hand. In this way, not only the fingers are allowed to provide user input, but also the thumb of the hand. Such a thumb sensor may for instance be a joystick to be manipulated by a thumb and allowing to provide user input associated with different directions, e.g. "up", "down", "right" and "left".

In an alternative embodiment, the set of sensors comprise four thumb sensors to be controlled by the thumb, preferably arranged around the thumb such that interaction between thumb and one of the thumb sensors is possible for four different movements of the thumb relative to the hand. The four different movements may comprise an "up", "down", "right" and "left" movement of the thumb relative to the hand.

TABLE 2 suitable combinations of finger supports and fingers when
more than one finger can be received in a finger support

| Embodiment no. | First finger support | Second finger support |
| --- | --- | --- |
| A | index finger | middle finger and ring finger |
| B | index finger | middle finger, ring finger and little finger |
| C | index finger | ring finger and little finger |
| D | index finger and middle finger | ring finger |
| E | index finger and middle finger | ring finger and little finger |
| F | index finger and middle finger | little finger |
| G | middle finger | ring finger and little finger |
| H | middle finger and ring finger | little finger |
| I | index finger, middle finger and ring finger | little finger |

In an embodiment, the input device may be configured such that simultaneous interaction between two thumb sensors is possible to indicate a direction of e.g. a cursor or mouse in between the movement directions associated with said two thumb sensors, e.g. simultaneously interacting with the "up" and "right" sensors to indicate a direction obliquely upwards to the right. The thumb sensors may be analog sensors, preferably being force or pressure sensitive so that a ratio between the interaction forces or pressures with respect to said two thumb sensors can be used to determine said direction and the sum of the corresponding interaction force/pressure vectors can for instance be used to determine a movement speed of the cursor or mouse in said direction. Other sensors, e.g. optical sensors or proximity sensors detecting how deep a button is being pressed, are also envisaged.

The above described embodiments in relation to the thumb sensors may also apply to other sensors of the device, e.g. especially in case other sensors are used for controlling the cursor or mouse.

In an embodiment, one or more sensors are configured to provide feedback, e.g. by using a spring force, for instance provided by a rubber element, or e.g. by using a magnetic force.

In an embodiment, the input device is configured to provide feedback, e.g. haptic feedback, for instance using vibration, e.g. ultrasonic haptic feedback.

In an embodiment, the device comprises sensors to measure movement of the device as a whole, thereby allowing to measure hand motions of the hand carrying the device. Such sensors may comprise a gyroscope and/or accelerometer.

In an embodiment, the input device comprises elements for easy detection by a camera, e.g. markers, for instance infrared light sources for detection by an infrared camera of the direct or reflected light.

The invention also relates to a combination of a first wearable data input device and a second wearable data input device, wherein both the first and second input device are an input device according to any aspect of the invention, wherein the first input device is configured for a left hand, and wherein the second input device is configured for a right hand.

It is noted that when two similar wearable data input devices are used as first and second wearable data input device, some of the functions are provided twice. An example thereof is that the thumb sensors in mouse mode may allow movement of the mouse using the thumb of the left hand and the first wearable data input device and using the thumb of the right hand and the second wearable data input device. In such cases, the wearable data input device may be configured to assign some of the sensors other functions, e.g. allowing one thumb to control the mouse and the other thumb to provide one-click, double-click and other slide and/or zoom functions. Also, sensors may be left out when a function would be provided twice. E.g. a sensor on the right hand that indicates a directional signal to the left might be left out because a sensor on the left hand already can indicate a signal to the left.

Hence, it is explicitly mentioned here that the first and second wearable data input device are not necessarily identical input devices. The first and second wearable data input device may complement each other in functionality, even to such an extent that the first and second wearable data input device nearly always have to be used simultaneously in order to properly provide data input to an external device. As an example. The first wearable data input device may be provided with the ability to input a signal corresponding to an ALT key while such ability may not be present for the second wearable data input device.

In an embodiment, the output unit of one of the first and second input device is configured to send date corresponding to the user input to the output unit of the other one of the first and second input device, and the output unit of the other one of the first and second input device is configured to send data corresponding to the user input of the first input device and data corresponding to the user input of the second input device to an external device. This allows to properly combine user input of the first and second input devices, e.g. when a function is addressed by simultaneously interacting with one or more sensors of the first input device and with one or more sensors of the second input device.

According to a second aspect of the invention, there is provided a wearable data input device to be worn on a human hand, comprising:
- a base comprising a proximal end and a distal end opposite the proximal end;
- a finger support connected to the base to receive a portion of a finger of the hand corresponding to the proximal phalanges in order to allow the corresponding finger support to carry the wearable data input device;
- at least one sensor arranged at the distal end of the base to interact with fingertips of the hand to allow user input; and
- an output unit to send data corresponding to the user input to an external device.

An advantage of the wearable data input device according to the second aspect of the invention is that the input device is easy to put on and off. The input device is supported by the finger support, so that putting on and off is simply putting the finger support over the finger or removing the finger support.

Features and embodiments described in relation to the first aspect of the invention may readily be combined with the invention according to the second aspect, where applicable, and will not all be described here in detail to prevent unduly repetition of these features and embodiments. This also means that features and embodiments of the second aspect of the invention may readily be combined with the invention according to the first aspect of the invention.

In an embodiment, the finger support is rotatably connected to the base to rotate about a rotation axis, which rotation axis is arranged to be substantially aligned with the metacarpophalangeal joint of the corresponding finger when said finger portion is received in the finger support.

In an embodiment, a spring is provided at the proximal end of the base in order to provide a spring connection between the hand and the base, e.g. a spring connection and the part of the base where the sensors are arranged, i.e. the distal end.

In an embodiment, the rotation axis is delimited. As a result, the position of the sensors arranged at the distal end of the base may be delimited.

In an embodiment, the proximal end side of the base is configured to engage with the hand or corresponding arm at a wrist side of the metacarpophalangeal joint or with something worn on the hand or arm at a wrist side of the metacarpophalangeal joint.

In an embodiment, the finger support is configured to engage with the corresponding finger portion at one or more of the following locations:
 a first region at a dorsal side of said finger portion, preferably at or near a joint in between the proximal phalanges and intermediate phalanges, i.e. at or near the proximal interphalangeal joint;
 a second region at a palmar side of said finger portion, preferably at or near the joint in between the proximal phalanges and intermediate phalanges, i.e. at or near the proximal interphalangeal joint;
 a third region at the dorsal side of said finger portion, preferably at or near the metacarpophalangeal joint; and
 a fourth region at the palmar side of said finger portion, e.g. at or near the metacarpophalangeal joint,
wherein preferably a centroid of the first region is closer to the proximal interphalangeal joint than a centroid of the second region in case the finger support is configured to engage with the corresponding finger portion at at least the first and second regions, and wherein preferably a centroid of the third region is closer to the metacarpophalangeal joint than a centroid of the fourth region in case the finger support is configured to engage with the corresponding finger portion at at least the third and fourth region.

In an embodiment, a centroid of the third region is closer to the metacarpophalangeal joint than the centroid of the second region in case the finger support is configured to engage with the corresponding finger portion at at least the second and third regions.

In an embodiment, a dimension of the first, second, third and/or fourth region in a direction from the proximal interphalangeal joint to the metacarpophalangeal joint is smaller than a dimension in a direction perpendicular thereto.

In an embodiment, the first and second region are isolated from or loosely coupled to the third and fourth region. An advantage thereof is that the engagement between finger support and corresponding finger may be minimal or at least reduced making putting on and off of the device even more easy. Another advantage may be that there is room for other elements such as rings (jewelry) around the fingers not interfering with the finger support.

It is further noted that the regions being isolated from or loosely coupled to each other is seen from the perspective of the corresponding finger itself and does not necessarily mean that the portions of the finger support engaging with the first to fourth regions, if present, are not interconnected. Being isolated or loosely coupled means that the interconnecting portions do not engage with the finger in a fully supporting way, thereby leaving space for finger tissue.

In an embodiment, the interconnecting portions have no significant contribution to the supporting function of the finger support.

In an embodiment, the interconnecting portions have no contribution to the supporting function of the finger support at all.

No significant contribution may mean that the contact is responsible for supporting less than 30%, preferably less than 20%, more preferably less than 10%, and most preferably less than 5% of the total weight to be supported.

In an embodiment, the finger support is a single element with engaging portions engaging with the corresponding finger and interconnecting portions connecting the engaging portions such that they do not engage with the corresponding finger. In an embodiment, the interconnecting portions engage with the corresponding fingers, but not in a supporting way. Hence, there may be contact between interconnecting portions and the corresponding finger, but this contact may not have a significant contribution to the supporting function of the finger support, especially not when the hand is in a palm-down orientation.

In an embodiment, isolation or loosely coupled may involve the entire area of a direct path over the finger surface from one finger support portion to another finger support portion.

In case an interconnecting portion is connecting a finger support at a dorsal side of the finger with a finger support at a palmer side of the finger, isolation or loosely coupled may involve the entire area formed by both direct paths over the finger surface between said two finger supports.

In an embodiment, the first and second region are isolated from each other.

In an embodiment, the third and fourth region are isolated from each other.

In an embodiment, the first and third region are isolated from each other.

In an embodiment, the first and fourth region are isolated from each other.

In an embodiment, the second and fourth region are isolated from each other.

In an embodiment, the second and third region are isolated from each other.

In an embodiment, the finger support comprises a ring segment for the first and second region and a separate ring segment for the third and fourth region, preferably, the finger support comprises a ring segment per region, in which the ring segments are connected to each other. The ring segments are in that case the engaging portions of the finger support.

In an embodiment, the ring segments are at least partially elastic.

In an embodiment, the interconnection between the portions of the finger support configured to engage with the second and fourth region is flexible, e.g. due to using an appropriate thickness of the material.

In an embodiment, the portions of the finger support configured to engage with the first to fourth region, where applicable, are rigid.

In an embodiment, an interconnection between two or more portions of the finger support configured to engage with the first to fourth region, where applicable, are elastic.

In an embodiment, the portion configured to engage with the second region and the portion configured to engage with the fourth region have a respective engaging surface with a normal thereto that is non-perpendicular to the respective proximal phalange of the corresponding finger and thus having a component in a direction towards said other portion of the finger support. As a result thereof, the engaging surfaces substantially follow the naturally occurring contour of an average finger which makes the finger support more comfortable. The angle between the normal and a direction perpendicular to the proximal phalange may be in the range of 5-25 degrees, preferably in the range of 10-20 degrees.

In an embodiment, the finger support is configured to engage with the corresponding finger portion at the third and fourth region only. The finger support may have a ring-like shape or be a rigid ring. In any case, the finger support may have a diameter that enables a finger to be easily received in the finger support while at the same time allows the finger to engage with and support the finger support. The third and fourth region may be loosely connected to each other and/or be isolated from each other.

The third and fourth region may be connected to each other at one or both lateral sides of the corresponding finger portion in between the dorsal and palmar sides of the corresponding finger portions. Each of the connections at these lateral sides may be absent, i.e. thereby isolating the third and fourth region at the respective lateral side, may form a loose connection, may be an elastic connection or may be a rigid connection. The absence of a connection or a loose connection may extend over 5-40% of the circumference of the (circular or circular shaped or circular-like) cross-section defined by the finger support, preferably over 10-30%, and more preferably over 20%. For the index finger, the absence of a connection or a loose connection may be provided at least at the lateral side facing towards the thumb, and for the little finger, the absence of a connection or a loose connection may be provided at least at the lateral side facing away from the ring finger. Preferably, the absence of a connection or a loose connection is only provided at one lateral side, preferably facing towards the thumb for the index finger, and preferably facing away from the ring finger for the little finger.

As mentioned earlier, the finger support may be rotatably connected to the base to rotate about a rotation axis, which rotation axis is arranged to be substantially aligned with the metacarpophalangeal joint of the corresponding finger when said finger portion is received in the finger support.

In an embodiment, the finger support is a first finger support and the rotation axis is a first rotation axis, wherein the input device further comprises a second finger support to receive a portion of another finger of the hand corresponding to the proximal phalanges in order to allow the other finger portion to carry the wearable data input device as well, and wherein the second finger support is rotatably connected to the base to rotate about a second rotation axis, which rotation axis is arranged to be substantially aligned with the metacarpophalangeal joint of the corresponding other finger when said second finger portion is received in the second finger support. An advantage of using two finger supports is that the base is supported at two locations and additional supports, e.g. by engaging a proximal end side of the base with the hand or corresponding arm at a wrist side of the metacarpophalangeal joint, is not necessary per se.

According to a third aspect of the invention, there is provided an operating method of a wearable data input device, e.g. a wearable data input device according to the first, second or fourth aspect of the invention, wherein the wearable data input device includes a set of sensors to interact with fingertips of the hand to allow user input, and an output unit to send data corresponding to the user input to an external device, and wherein the method comprises the following steps:

a) assigning all sensors a corresponding predetermined input function;
b) providing user input in accordance with the assigned input functions;
c) changing the assignment of the sensors by assigning at least one sensor another predetermined input function;
d) providing user input in accordance with the changed assigned input functions.

In an embodiment, different sensors arranged to interact with one of the fingers may be assigned a different letter or key from a computer keyboard, wherein changing the assignment means that at least one sensor is assigned a different letter or key. It is also possible that all sensors associated with the fingers, or all sensors associated with a keyboard mode to provide text as input are assigned a different letter or key and any intermediate situation in which only a part of the sensors is assigned a different letter or key. Although letter or key is used here, any input function may be changed.

In an embodiment, the change of assignment is caused by operating a separate sensor, e.g. using the thumb, or by operating a predetermined combination of sensors.

In an embodiment, the set of sensors comprise two or more, preferably four, thumb sensors to be controlled by, preferably arranged around the thumb such that interaction between thumb and one of the thumb sensors is possible for four different movements of the thumb relative to the hand. The different movements may comprise an "up", "down", "right" and/or "left" movement of the thumb relative to the hand. Using these different movements, the thumb can be used to indicate different changes of assignment.

In an embodiment, different sensors arranged to interact with one of the fingers may be assigned a different letter or key from a computer keyboard, wherein changing the assignment means that at least some of the sensors are assigned to one of the arrow keys used to allow e.g. cursor control, moving between characters in a word processing or text editing application, moving between different cells in a spreadsheet or database or moving a picture in a document, which may be referred to as arrow mode.

In an embodiment, the wearable data input device comprises a so-called mouse mode in which a mouse pointer can be moved over the screen of a device similar to a computer mouse using one or more of the sensors, e.g. a joystick operated by the thumb or the thumb sensors controlled by, preferably arranged around the thumb.

Hence, in an embodiment, the wearable data input device can be brought in a keyboard or arrow mode in which text and/or data can be inputted similar to a computer keyboard, and by changing the assignment can be brought into mouse mode in which data can be inputted similar to a computer mouse. It is also possible that changing the assignment only relates to some sensors, so that a part of the device is in keyboard or arrow mode and another part of the device is in mouse mode. Hence, different modes may co-exist.

In addition, or alternatively to the keyboard mode, arrow mode or mouse mode, the wearable data input device may be brought into one or more game modes in which the sensors are assigned game specific input functions allowing to play a game.

Additionally, or alternatively, the data input device may be configured to be brought into device specific modes, e.g. a tablet mode, phone mode, VR (virtual reality) mode or TV (television) mode.

In an embodiment, the data input device is a wearable data input device in which the set of sensors also includes at least one sensor configured to interact with the thumb of the hand, and wherein the at least one sensor configured to interact with the thumb is used to provide a direction as user input, e.g. for a cursor or mouse or a direction of change of assignment on a keyboard.

In an embodiment, the data input device is operated in one or more of the following modes:
 a keyboard mode in which at least some of the sensors have been assigned keys on a standard keyboard, e.g. a QWERTY keyboard or any other type of keyboard;
 an arrow mode in which at least some of the sensors have been assigned two to four different moving directions;
 a mouse mode in which at least some of the sensors have been assigned four different moving direction to control a mouse pointer over a screen and possibly including a right and/or click functionality for selecting and deselecting; and
 one or more device modes, which may include a game mode, in which at least some of the sensors have been assigned device or game specific input functions.

In an embodiment, the data input device switches (at least partially) between modes upon specific user input, which may be a specific switch or a specific combination or sequence of interactions with one or more sensors. In an embodiment, when modes are able to at least partially co-exist, the data input device is configured to switch a mode on or off upon specific user input.

In an embodiment, the four moving directions correspond to an up, down, left and right moving direction of a cursor or mouse pointer/arrow.

In an embodiment, the data input device is operated to mimic a mouse wheel, multi touch or dial knob allowing associated functionalities and input possibilities.

For instance, when using the sensors to mimic a mouse wheel it may be easy to scroll through a web page or document, wherein e.g. the sensors can be used to set the scroll speed, e.g. by duration of engagement with sensor and/or by analog value of thumb sensor.

Further, for instance, when using the sensors to mimic a multi touch, and when using two wearable data input devices for both hands, both thumbs may be used to zoom in by moving the thumbs away from each other, i.e. in opposite directions, or to zoom out by moving the thumbs towards each other.

Features and embodiments, described in relation to the first and/or second aspect of the invention may readily be combined with the invention according to the third aspect of the invention, where applicable, and will not be described here in detail to prevent unduly repetition of these features and embodiments. Hence, also features and embodiments described in relation to the third aspect of the invention may readily be combined with the first and/or second aspect of the invention, where applicable.

It is explicitly mentioned here that "wearable" in the context of the third aspect of the invention also refers to handheld, e.g. as well-known game consoles are held.

According to a fourth aspect of the invention, there is provided a wearable data input device to be worn in a human hand, comprising:
 a base comprising a proximal end and a distal end opposite the proximal end;
 a support connected to the base to engage with a portion of the hand to carry the wearable data input device;
 at least one sensor arranged at the distal end of the base to interact with fingertips of the hand to allow user input; and
 an output unit to send data corresponding to the user input to an external device.

In an embodiment, the support comprises a part engaging with the palm and/or back of the hand, e.g. a strap.

In an embodiment, the set of sensors also include at least a thumb sensor to interact with the thumb of the hand. In this way, not only the fingers are allowed to provide user input, but also the thumb of the hand. Such a thumb sensor may for instance be a joystick or a track ball to be manipulated by a thumb.

In an embodiment, the set of sensors comprise four thumb sensors to be arranged around the thumb such that interaction between thumb and one of the thumb sensors is possible for four different movements of the thumb relative to the hand. The four different movements may comprise an "up", "down", "right" and "left" movement of the thumb relative to the hand.

Features and embodiments, described in relation to the first, second and/or third aspect of the invention may readily be combined with the invention according to the fourth aspect of the invention, where applicable, and will not be described here in detail to prevent unduly repetition of these features and embodiments. Hence, also features and embodiments described in relation to the fourth aspect of the invention may be readily combined with the first, second and/or third aspect of the invention, where applicable.

In an embodiment, the base can be moved out of the way at least partially to allow some or all of the fingers to be used for another purpose then providing user input via the input device, e.g. to touch a touch screen, manipulate buttons or other devices, keeping or holding other objects.

In an embodiment, the support is configured such that the base can be rotated about the hand from the palm side of the hand to the back side of the hand. In an embodiment, the support comprises a first finger support to receive a portion of a finger of the hand corresponding to the proximal phalanges in order to allow the corresponding finger portion to carry the wearable data input device, and a second finger support to receive a portion of another finger of the hand corresponding to the proximal phalanges in order to allow the other finger portion to carry the wearable data input device as well, wherein the finger support is rotatably connected to the base to rotate about a rotation axis, which rotation axis is arranged to be substantially aligned with the metacarpophalangeal joint of the corresponding finger when said finger portion is received in the finger support, wherein the second finger support is rotatably connected to the base to rotate about a second rotation axis, which rotation axis is arranged to be substantially aligned with the metacarpophalangeal joint of the corresponding other finger when said second finger portion is received in the second finger support, and wherein one of the first and second finger supports is releasably connected to the base allowing the base to rotate to the back side of the hand while being supported by the other one of the first and second finger supports.

In an embodiment, the base comprises a first part including the proximal end of the base and a second part including the distal end of the base, wherein the set of sensors is arranged on the second part, and wherein the second part is rotatable about a corresponding rotation axis relative to the first part between an operational position, in which the second part faces the fingers and allows the fingers to provide user input, and a non-operational position, in which the second part is at a distance from the fingers allowing the fingers to be moved freely without interfering with the second part.

In an embodiment, the set of sensors comprises a column of sensors associated with one of the fingers, preferably a column of sensors is provided for each finger.

BRIEF DESCRIPTION OF THE DRAWINGS

The invention will now be described in a non-limiting way with reference to the accompanying drawings in which like parts are indicated by like reference symbols and in which.

DETAILED DESCRIPTION OF THE INVENTION

Figure 1:
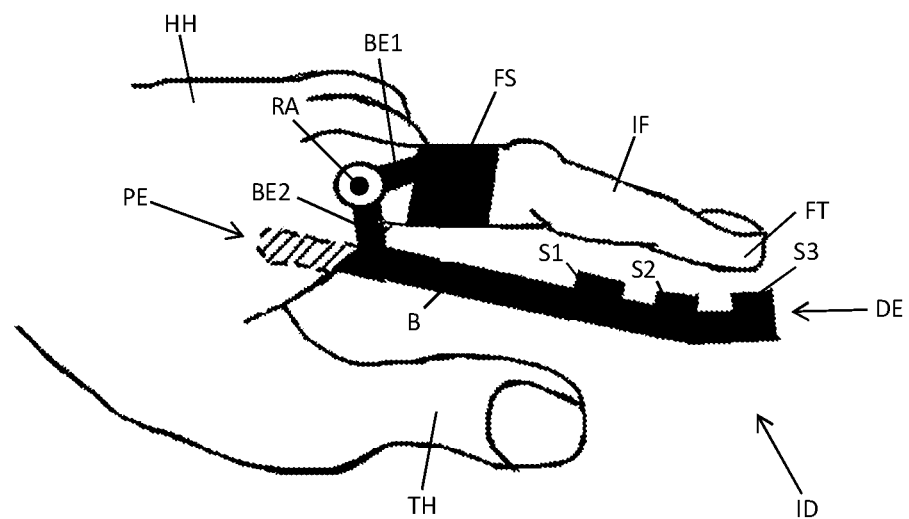
FIGS. 1-2 schematically depicts a wearable data input device according to an embodiment of the invention.
Figure 2:
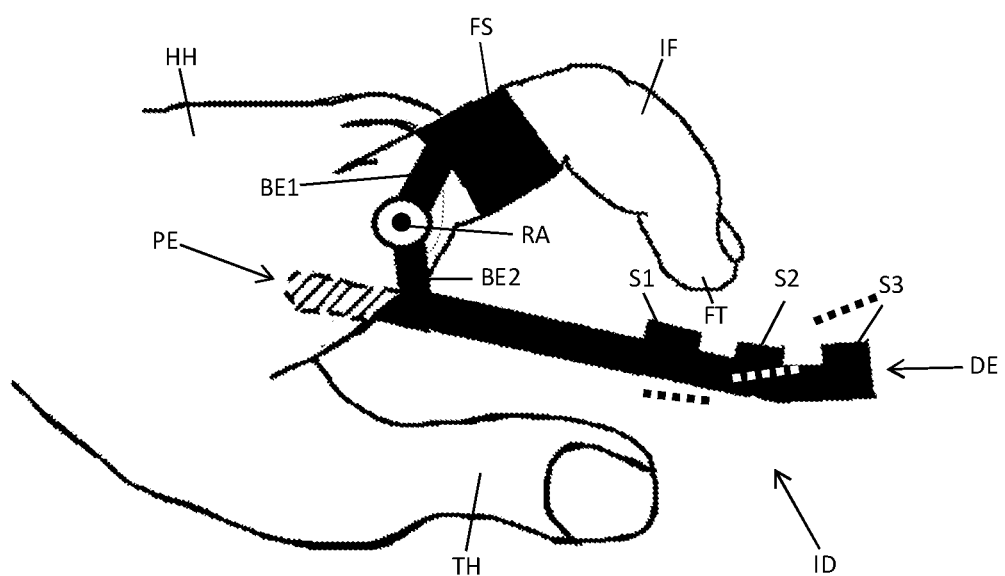

FIGS. 1 and 2 schematically depict a wearable data input device ID according to an embodiment of the invention when worn on a human hand HH. A human hand is known to comprise a thumb and four fingers, which in this description will respectively be denoted index finger, middle finger, ring finger and little finger when starting at the thumb side of the hand. In FIG. 1, the thumb TH and the index finger IF are clearly visible. The other fingers are hidden behind the index finger IF.

The thumb TH and fingers comprise bones, called phalanges or phalanx bones. The phalanx bone closest to the hand is referred to as the proximal phalanges. The phalanx bone at the fingertips is referred to as the distal phalanges. The thumb only comprises a corresponding proximal phalanges and distal phalanges. The fingers further comprise an intermediate phalanges in between the proximal phalanges and the distal phalanges.

The data input device ID comprises a base B with a proximal end PE and a distal end DE opposite the proximal end PE. The proximal end PE side of the base B is configured to engage with the hand HH, here the palm of the hand HH and is therefore not visible in FIGS. 1 and 2, but indicated using dashed lines.

The distal end DE side of the base B is provided with a set of sensors S1, S2, S3 to interact with a fingertip FT of the index finger IF of the hand HH to allow user input.

Figure 3:
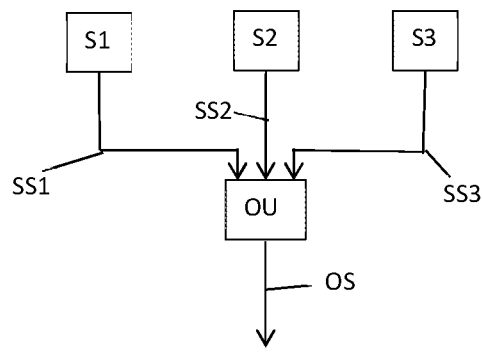
FIG. 3 schematically depicts an electric diagram of the data input device of FIGS. 1 and 2.

FIG. 3 schematically depicts an electric diagram of the data input device ID of FIGS. 1 and 2. Shown in FIG. 3 are the sensors S1-S3. The sensors S1-S3 are connected to an output unit OU configured to send data corresponding to the user input to an external device (not shown). Sending the data to an external device is preferably done wirelessly, e.g. using Bluetooth, WiFi, infrared, ZigBee, or any other wireless data transfer method. However, it is not excluded that the data transfer between the input device and the external device is carried out using a wire connection, e.g. when a fast and stable connection is required, for instance when using the input device for gaming. The user input transferred from the sensors S1-S3 to the output unit is indicated by the sensor signals SS1, SS2 and SS3, and the data transfer from the output unit to the external device is indicated by the output signal OS.

Referring again to FIGS. 1 and 2, the data input device ID comprises a finger support FS to receive a portion of a finger IF of the hand HH corresponding to the proximal phalanges. The finger support FS is here embodied in the form of a ring, but can be any supporting structure suitable to engage with the finger IF such that when said finger portion is received in the finger support FS, the input device ID is carried by the hand via the finger support. In this embodiment, engagement between the finger portion and the finger support is such that an orientation of the finger support substantially follows the orientation of said finger portion.

In an embodiment, the finger support FS is a rigid ring having a diameter that enables a finger to be easily received in the finger support while at the same time allows the finger to engage with and support the finger support. In another embodiment, the finger support has a ring-like shape, but comprises elastic material to allow the finger support to be used with a wide variety of fingers.

In an embodiment, the finger support FS is releasably mounted to the base B, so that a variety of rings, e.g. having different diameters, can be provided and a user can choose and mount a ring to the base B that matches best with the dimension of the finger of the user.

The finger support FS is attached to a connecting member, in this case a beam BE1, which in turn is hingedly connected to a connecting member, in this case a beam BE2 of the base B, so that beam BE1 is able to rotate relative to beam BE2 about a rotation axis RA. The rotation axis RA extends substantially out of plane of the drawing and is positioned to be aligned with the metacarpophalangeal joint of the corresponding finger IF when said finger portion is received in the finger support. The metacarpophalangeal joint can be found between the corresponding proximal phalanges and the corresponding metacarpal bone. Due to this location of the rotation axis RA, the finger IF can easily be moved up and down relative to the base B while at the same time continuing to support the data input device ID. This is illustrated by comparing the position of the finger IF in the FIGS. 1 and 2. In FIG. 1, the finger is able to interact with sensor S3 and in FIG. 2, the finger has moved upwards allowing the fingertip FT to interact with the sensor S1. Although not shown, an intermediate position of the finger allows the finger to interact with sensor S2.

Although the sensors S1-S3 have been depicted as being provided on a more or less flat base B, it is also possible to provide the sensors at different positions allowing to limit the required movement of the fingers to reach the sensors.

FIG. 1 also depicts another embodiment in which the sensors are arranged differently using dashed lines to indicate the location of upper surfaces of the sensors S1-S3. It will be apparent for the skilled person that such an arrangement may require a different shape of the base B in side view, e.g. a step-like shape or a concave shape. From the orientation of the dashed lines it can also be seen that the upper surfaces of the sensors may be tilted relative to each other so that a normal to these upper surfaces may be substantially aligned with a frequently occurring direction of approach of the fingertip.

In an embodiment, the location of upper surfaces of the sensors may be chosen such that when a fingertip engages with a respective upper surface, an angle between the proximal phalange and the metacarpal phalange is in the range of 150 to 170 degrees, e.g. 160 degrees. This means a deviation of 10-30 degrees, e.g. 20 degrees, compared to the normal angel with stretched fingers.

It is explicitly noted here that an upper surface of a sensor arranged to engage with a fingertip does not necessarily have to be directly above or near the sensor part where the engagement between fingertip and sensor causes a signal representing data input.

Although a set of sensors S1-S3 for the index finger is shown, it will be apparent to the skilled person that any number of sensors may be provided, e.g. 1, 2, 3, 4 and 5 sensors, and that the set of sensors may include additional similar subsets for other fingers, like the middle finger, the ring finger, and the little finger.

Although the embodiment has been described and depicted only for the index finger IF, the base and set of sensors may also be extended in a direction parallel to the plane of the drawing so that a similar arrangement is provided for other fingers of the hand HH, which will be described in more detail below.

Although not shown, the base may also provide a rest position in which the fingertip FT of the finger is able to engage with the base B, so that the fingers can rest against the base B without interacting with any sensor.

In this embodiment, the input device is depicted in combination with a left hand HH. A similar device can be provided for the right hand of a user.

Figure 4:
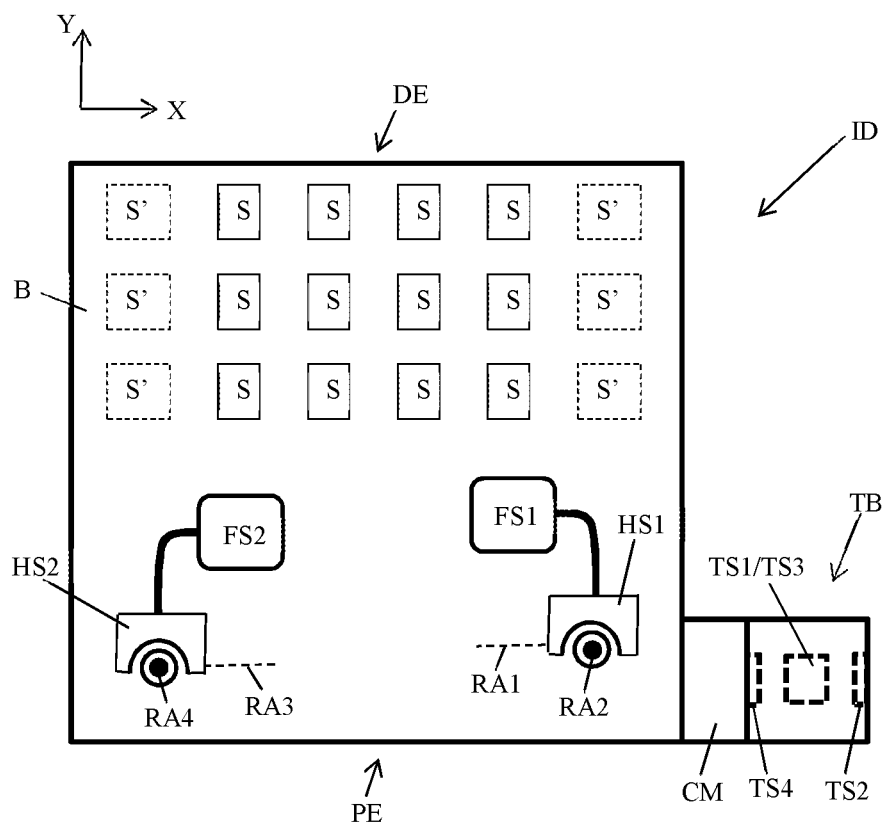
FIG. 4 schematically depicts a wearable data input device according to another embodiment of the invention.

FIG. 4 depicts a schematic top view of a wearable data input device ID to be worn on a human hand (not shown here but see for reference FIGS. 1 and 2) according to another embodiment of the invention.

The data input device ID comprises a base B comprising a proximal end PE and a distal end DE opposite to the proximal end PE. In this embodiment, the base B comprise all electronics, including a battery to power the data input device ID and an output unit configured to send data corresponding to user input entered via the data input device ID to an external device, e.g. a computer, phone, game controller, television, smart TV, virtual reality glasses, tablet or any other device.

The base B further comprises a set of sensors S, in this embodiment, in the form of a 3×4 array of sensors S at the distal end side of the base, wherein the three rows extend in an X-direction and wherein the four columns extend in a Y-direction. The sensors S allow to interact with fingertips (FT) of the hand to allow user input. The sensors S are thus in connection with the output unit similarly as in FIG. 2.

The data input device ID further comprises a first finger support FS1 and a second finger support FS2, which in this embodiment are configured to receive an index finger and little finger of a left hand, respectively. The first and second finger supports FS1, FS2 are configured to adjust their orientation to the orientation of the respective finger portions, but at the same time allow the data input device ID to be supported by the human hand via the finger supports and corresponding finger portions. Both the first and second finger support may therefore comprise one or more rigid portions and one or more flexible, preferably elastic, portions. The one or more flexible, preferably elastic portions allow a range of finger diameters to fit in the first and second finger supports.

The first and second finger supports FS1, FS2 are rotatably connected to the base B via a respective hinge structure HS1 and HS2. The hinge structures HS1, HS2 each provide two rotation axes to allow the respective finger supports to move relative to the base B.

Hinge structure HS1 defines a first rotation axis RA1 substantially extending in X-direction and a second rotation axis RA2 substantially extending in a Z-direction that is perpendicular to both the X- and Y-direction. Hinge structure HS2 defines a third rotation axis RA3 substantially extending in X-direction and a fourth rotation axis RA4 substantially extending in Z-direction.

The first and third rotation axis RA1, RA3 are arranged to be substantially aligned with the metacarpophalangeal joint of the corresponding finger when a finger portion is received in the respective first or second finger support FS1, FS2 and allow the fingers to be moved up and down in the Z-direction away and towards the base B to interact with the array of sensors S. As the metacarpophalangeal joint of, in this embodiment, the little finger and the index finger do not have to be at the same location seen in Y-direction, the first and third rotation axis RA1, RA3 do not necessarily have to be aligned with respect to each other.

The second and fourth rotation axis RA2, RA4, although not necessary per se, add an additional degree of freedom for the fingers, preferably as depicted here for the index finger and the little finger, to move in X-direction, e.g. to reach additional sensors arranged next to the 3×4 array, e.g. one or two sensors next to the 3×4 array to add a specific functionality, for instance a sensor to switch between input modes (keyboard mode, mouse mode and/or game mode) or a special key/data input that is semi-permanently provided (e.g. SHIFT key, ESC key, etc.). Alternatively, or additionally, a sensor on the second and/or fourth rotation axis RA2, RA4 may change the meaning of a sensor in the array. Alternatively, or additionally, a sensor in the array may e.g. be able to detect position information, where e.g. touching on the left side has a different meaning than touching on the right side. In FIG. 4, an embodiment is shown in which additional columns of sensors S' as indicated in dashed lines can be arranged next to the 3×4 array, which then effectively becomes a 3×5 array or a 3×6 array.

In an embodiment, the position of the hinge structures HS1, HS2 relative to the base, i.e. a distance between the first rotation axis RA1 and the base B, and between the third rotation axis RA3 and the base B is adjustable. This allows to adjust the distance between the respective finger support and the base and to optimize this distance depending on the size of the hand and/or fingers.

Although in the embodiment of FIG. 4, when traveling from the base B to the hinge structures HS1, HS2, the rotation axes RA2, RA4 are respectively encountered first and subsequently the rotation axes RA1, RA3, it is also possible that the order of rotation axes is reversed. Further, the rotation axis may be formed by a longitudinal axis of a hinge part, but can be also be provided by an equivalent kinematic joint in which the rotation axis is located in free space. Alternatively, the location of the rotation axes RA1, RA3 may also be combined, e.g. when a ball and socket joint is used which is able to rotate in two orthogonal directions, or when there is sufficient play to allow rotation in two orthogonal directions.

The data input device ID further comprises a thumb portion TB. In FIG. 4, the thumb portion is shown in plan view, but for clarity reasons, the thumb portion is also shown in rear view in FIG. 5. The thumb portion TB is attached to the base B via a connecting member CM. It will be apparent to the skilled person by providing the thumb portion TB on the right side of the base B, the data input device ID is more suitable for a left hand and that making the data input device ID more suitable for a right hand, the thumb portion TB needs to be attached to the left side of the base B.

The thumb portion TB of this embodiment comprises a tubular cross section with four sidewalls W1-W4 enclosing a space SP to receive a thumb of a human hand. In this embodiment, each sidewall W1-W4 is provided with a corresponding sensor TS1-TS4 to allow additional user input using the thumb as will be explained below in more detail.

Each sensor S and/or sensor S' and/or sensor TS1-TS4 may comprise one or more detectors to detect interaction with the fingertips or thumb. Such a detector may be in the form of a switch, but a sensor may alternatively or additionally comprise an analog sensor, such as a force sensor, optical sensor or proximity sensor, to detect the amount of force or resulting movement when the fingertip or thumb engages with the sensor. Other examples of sensors or detectors that can be used are a pushbutton, capacitive sensor, optical sensor or any other sensor allowing fingertips or thumbs to interact with in order to allow user input In an embodiment, the sensors S, and possibly the sensors S', may be provided with a sensor display allowing to indicate the kind, type or value of user input when interacting with the sensor. However, a separate display indicating this may also be provided at another location, e.g. above the hand where the display is easily visible for a user. It is also possible that an external screen, e.g. a computer screen, TV screen or any other external screen is used to provide such information to the user.

In an embodiment, the proximal end side of the base B is configured to engage with the hand, e.g. the palm of the hand, or corresponding arm at a wrist side of the metacarpophalangeal joint in order to delimit the freedom to move the base B, but it is explicitly noted here that this is not essential per se. More ways to delimit the moveability can be envisaged, for instance by using at least two finger supports where one finger support can delimit rotation, e.g. rotation about the RA1 or RA3 rotation axis, of the other finger support.

Although the base B is depicted as a rigid structure in the above schematic drawings, it is specifically noted here that the base B may comprise a plurality of interconnected parts that together form the base B. In an embodiment, the base B may comprise a main part to carry the one or more finger supports and to accommodate the majority of the electronics, e.g. the battery, the control unit, etc. The base B may further comprise one or more finger base parts carrying at least the set of sensors. The one or more finger base parts may be connected to the main part such that their position and/or orientation relative to the main part can be adjusted. The main part may for instance have a concave upper surface for engagement with the palm of the hand, wherein the finger base part(s) are connectable to the main part at different locations on the concave upper surface such that connecting a finger base part at a specific location, both the position and orientation (following the contour of the upper surface) may be set.

FIGS. 6 to 10 depict a standard QWERTY keyboard layout. When providing a data input device ID as depicted in FIG. 4 comprising a 3×4 array of sensors S, the data input device ID may be configured and used as follows to mimic the use of a real QWERTY keyboard.

Figure 6:
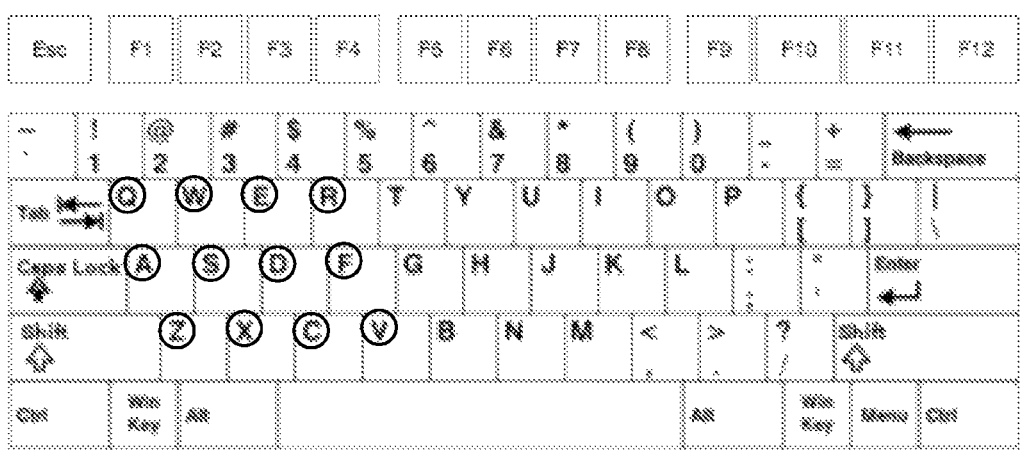
FIGS. 6-10 depict different configurations of the data input device of FIG. 4 on a computer keyboard layout.
Figure 7:
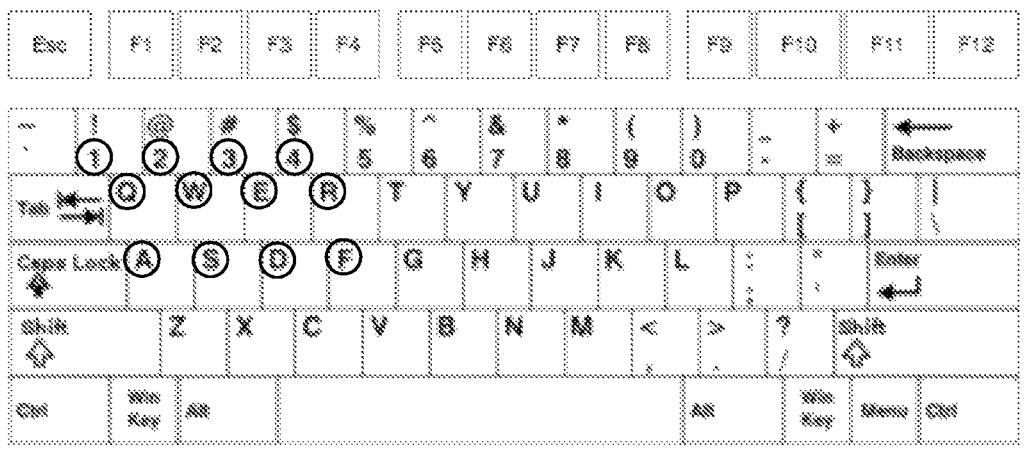
Figure 8:
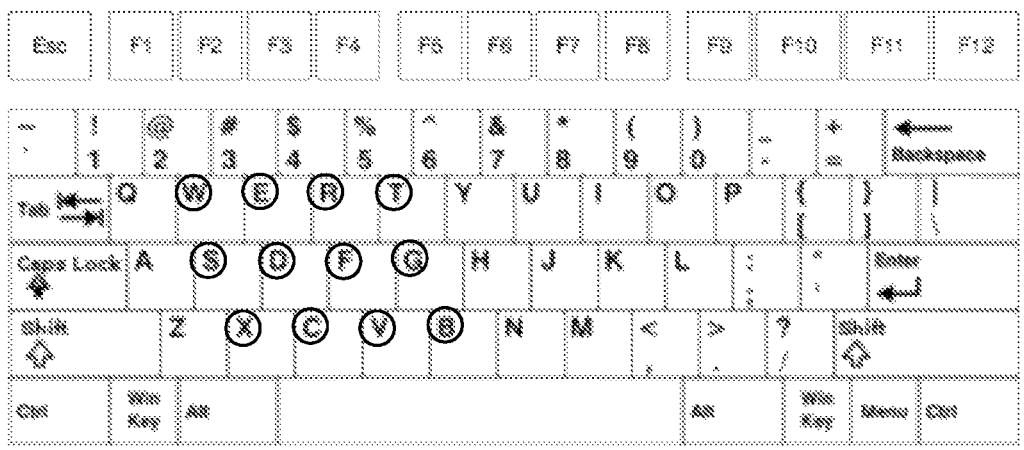

In this embodiment, by default, the array of sensors S is assigned to a 3×4 array of keys as indicated in FIG. 6 by encircling the symbols on the keys as an example to provide a predetermined input function for each sensor. Hence, in a default configuration, the sensors S may allow to enter the letters 'Q', 'W', 'E', 'R', 'A', 'S', 'D', 'F', 'Z', 'X', 'C', and 'V' by interaction between fingertips and corresponding sensors. As described above, a display may be provided, e.g. as a separate display or by displaying the letters on the sensors S itself or alternatively using an external display, so that there is a visual indication for a user enabling him to determine whether the correct letter is entered as user input.

Alternatively, or additionally, visual information may be provided on a display of the input device or on a display of the external device the input device is communicating with by showing the predetermined input function without actually providing user input.

This can for instance be done using a proximity sensor which detects the presence of a fingertip. When the proximity sensor indicates the presence of a fingertip nearby, this may trigger the display of the assigned predetermined input function. When the user actually wants to enter this input function as user input, the fingertip is operated further to engage with the corresponding detector/sensor.

In an embodiment, the proximity sensor indicates the presence of a fingertip nearby and thus indicates the distance between sensor and the fingertip which may be used to derive 3D information about the positions of the joints of the hand. This information can then be used for gaming or gesture control.

Another example is to use the combination of two sensors. The input device may for instance be provided with a display sensor, e.g. a pushbutton. By interacting with the display sensor first and subsequently or simultaneously interacting with another sensor, the assigned predetermined input function of the other sensor may be displayed without entering the input function as user input. When the user actually wants to enter this input function as user input, the other sensor may be interacted with again without interaction with the display sensor.

The mentioned display sensor is an example of a dedicated sensor providing a predetermined functionality. Another example of such a sensor is a mode sensor allowing to change mode or a caps lock sensor allowing to select or deselect caps lock.

It will be apparent that even when two similar data input devices ID are used, one suitable for the left hand as in FIG. 3 and one suitable for the right hand, not all keys on a standard QWERTY keyboard are addressable in a default configuration. However, as will be explained below, the sensors TS1-TS4 of the thumb portion can advantageously be used to reach other keys as well.

In order to reach the keys '1', '2', '3', and '4', the thumb may interact with sensor TS3 by moving downwards which corresponds to a similar relative motion of the thumb relative to the other fingers when these fingers reach for the keys '1', '2', '3', and '4' on a normal keyboard and thus feels natural. The entire array of sensors S thus shifts to be assigned to the keys encircled in FIG. 7. However, as an alternative, only the row of sensors assigned to the letters 'Q', 'W', 'E' and 'R' shifts to the keys '1', '2', '3', and '4'.

An opposite movement may be made over the virtual keyboard using sensor TS1 to reach for instance the 'Ctrl', Win Key', 'Alt' and 'spacebar' keys. Again, the entire array may shift or only the lower row of sensors, wherein lower means the row of sensors closest to the palm of the hand when using the input device.

In order to reach the keys 'T', 'G' and 'B', the thumb may interact with sensor TS4 by moving to the left which corresponds to a similar relative motion of the thumb relative to the other fingers when these fingers reach for keys 'T', 'G' and 'B' on a normal keyboard and again feels natural. The entire array of sensors S thus may shift to be assigned to the keys encircled in FIG. 8. Again, as an alternative, only the right column of sensor may shift An opposite movement may be made over the virtual keyboard using sensor TS2 to reach for instance the 'Tab' or 'Caps Lock' keys. Again, the entire array may shift or only the left column shifts. Alternatively, it is possible that the Tab' and/or 'Caps Lock' keys are skipped when shifting over the virtual keyboard when one or more of the keys have been assigned to dedicated sensors allowing them to be accessible at least most of the time.

Figure 9:
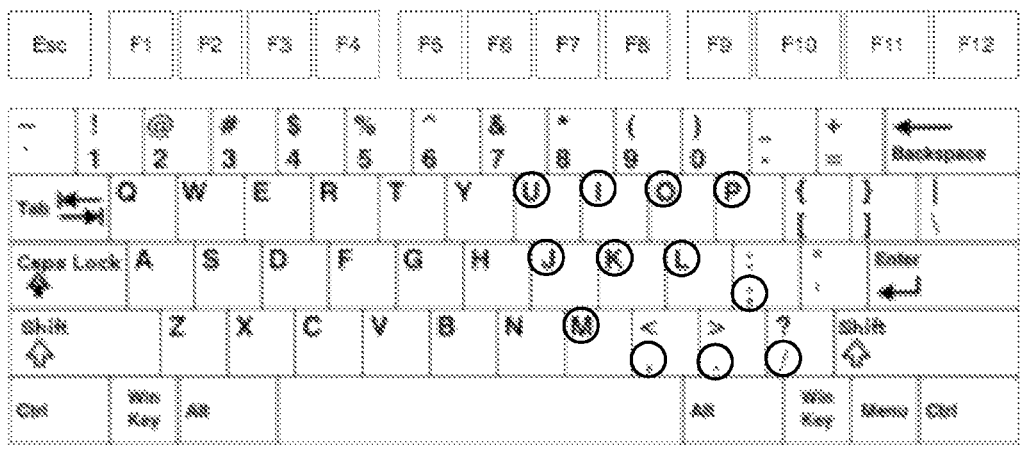

FIG. 9 depicts the 3×4 array of keys assigned by default to the array of sensors S of a data input device ID to be worn by a right hand by encircling the symbols on the keys. The keys surrounding this array can be reached by corresponding interaction of the thumb with sensors TS1-TS4 in a similar way as described above for the left hand.

Figure 10:
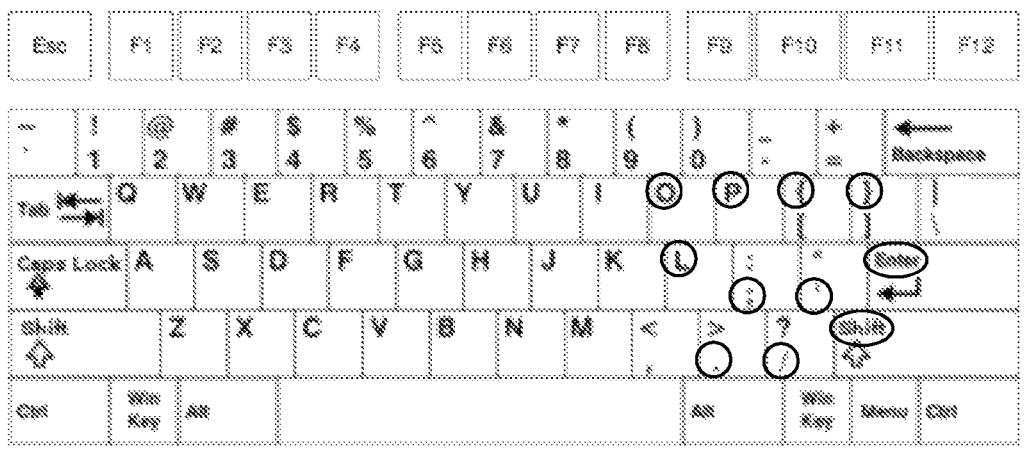

The above described interaction of the thumb with sensors TS1-TS4 to reach other keys only works to reach directly neighbouring keys. Hence, still some keys cannot be used as input, e.g. the 'Enter' key on the right side of the keyboard. To reach the 'Enter' key, the thumb may interact twice with sensor TS2, e.g. shortly after each other, to shift the entire array two keys to the right as indicated by FIG. 10. Similar movements may be made in other directions thereby enabling to reach any key of a standard QWERTY keyboard.

In the above described operation of the input device, changing input function may be affected by interaction between thumb and one of the sensors TS1-TS4. In an embodiment, engagement between thumb and one of the sensors TS1-TS4 changes the input function and subsequent disengagement between thumb and one of the sensors TS1-TS4 automatically changes the input back to the default setting, possibly after a time-out period has lapsed. However, it is also possible that disengagement does not change the input function, thereby allowing to engage again with the sensor, possibly within a predetermined time period, to result in an additional change of input function in the same direction or to engage with another sensor, e.g. the opposite sensor, to result in a change of input function in another direction, e.g. back to the default setting. In another embodiment, a distinction can be made between shifting one key in a direction or two or more keys in said direction by detecting the force with which the thumb engages with one of the sensors TS1-TS4. When the applied force is for instance below a predetermined value, the assignment of input function is shifted only one key in the corresponding direction, and when the applied force is above the predetermined value, the assignment of input function is shifted two keys in said corresponding direction.

It is also possible that both the left thumb and the right thumb work together to allow a distinction between fine shifts, i.e. shifts of one key in a particular direction, and coarse shifts, i.e. shifts of two or more keys in the same direction.

It is noted there that although the above described embodiments relate to a QWERTY keyboard, the same principle can be applied to any keyboard layout. Further, the above described embodiments use the keys Q. W, E, R, A, S, D, F, Z, X, C and V as starting point for the left hand, and keys U, I, O, P, J, K, L, ";", M, ",", ".", and "/" as starting point for the right hand, but the same principle can be applied to any starting point, also starting points that differ in size as an appropriate starting point may for instance be dependent on the number of available sensors.

Figure 11:
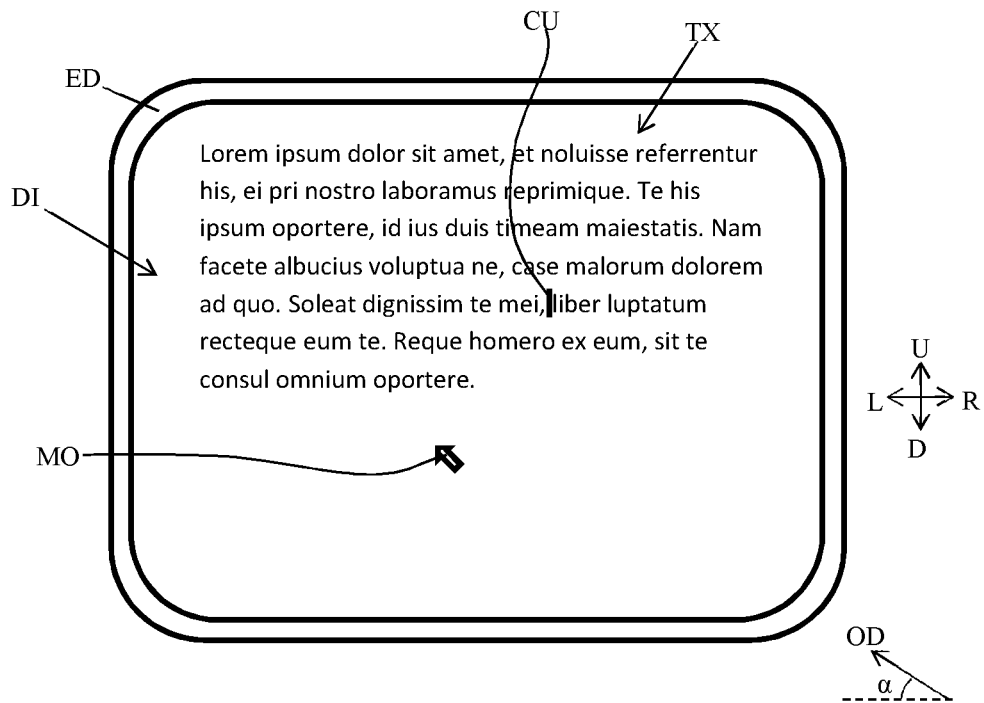
FIG. 11 schematically depicts an external device configured to be controlled by the data input device of FIG. 4.

FIG. 11 depicts an external device ED to be controlled by a data input device, in this example the data input device according to FIG. 4. The external device comprises a display DI. The display in this drawing depicts text TX that may be entered using the data input device, for instance using the method and configurations described in relation to FIGS. 6-10. To enter the text TX, the data input device is provided in keyboard mode.

Also shown in FIG. 11 is a cursor CU indicating the location where text will be added when corresponding user input is provided using a keyboard or the data input device according to the invention. In the course of typing the text, the location of the cursor CU may need to be changed to amend or add text at another location.

In an embodiment, this is done using an arrow mode of the data input device. The data input device can be provided in arrow mode using a dedicated sensor that allows to switch between modes, but it is also possible that switching mode is carried out using sensors that have been assigned other input functions by interacting simultaneously with a predetermined combination of sensors, which combination in any mode is preferably not or not frequently used.

In arrow mode, the assigned input function of the sensors is changed, preferably such that it is possible to indicate the following directions for the cursor CU:
a direction U corresponding to moving the cursor up;
a direction D corresponding to moving the cursor down;
a direction R corresponding to moving the cursor to the right; and
a direction L corresponding to moving the cursor to the left.

Figure 5:
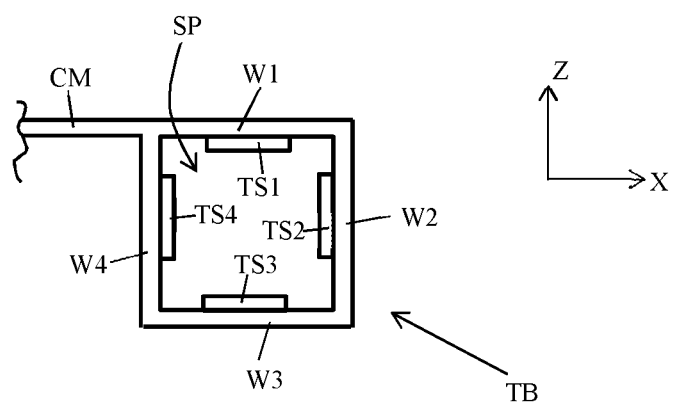
FIG. 5 schematically depicts a detail of the data input device of FIG. 4.

The directions may be assigned to distinct sensors, but alternatively a single sensor, e.g. with a plurality of detectors, such as a joystick may be used. As an example, the sensors TS1, TS2, TS3 and TS4 as shown in FIG. 5 may be assigned the directions U, R, D and L, respectively.

It is additionally or alternatively possible to provide the data input device in mouse mode allowing to control movement of an arrow (mouse pointer) MO that is normally controlled by a standard mouse or laptop pad. Again, the data input device can be provided in mouse mode using a dedicated sensor that allows to switch between modes, but it is also possible that switching mode is carried out using sensors that have been assigned other input functions by interacting simultaneously with a predetermined combination of sensors, which combination in any mode is preferably not or not frequently used.

In mouse mode, the assigned input function of the sensors is changed, preferably such that it is possible to indicate the following directions for the cursor CU:
a direction U corresponding to moving the arrow up;
a direction D corresponding to moving the arrow down;
a direction R corresponding to moving the arrow to the right; and a direction L corresponding to moving the arrow to the left.

Additionally, the left click (and possibly the right click) function of a mouse is/are assigned to one or more of the sensors.

In an embodiment, four sensors are used for the U, R, D and L movements. In an embodiment, the sensors TS1-TS4 are used for the U, R, D and L movements and one of the other sensors S or S' is assigned the left click or right click functionality. In an embodiment, a joystick is used for the U, R, D and L movements.

It might be convenient to add possible moving directions to mimic the functionality of a mouse more closely. Hence, by interacting for instance simultaneously with the U sensor and the L sensor, e.g. the sensors TS1 and TS4, the control unit may for instance be configured to output a signal corresponding to a direction OD having angle $\alpha=45$ degrees with respect to a reference direction parallel to the L and R direction. Hence, in addition to the U, D, R and L directions it may be possible to use other directions OD as well in accordance with the following table 3.

TABLE 3 overview of sensor combination and
angle $\alpha$ of the other direction OD

| Sensor combination | Angle $\alpha$ |
| --- | --- |
| U + R, e.g. TS1 + TS2 | 135 degrees |
| R + D, e.g. TS2 + TS3 | −135 degrees |
| D + L, e.g. TS3 + TS4 | −45 degrees |
| L + U, e.g. TS4 + TS1 | 45 degrees |

When the U, R, D and L sensors, e.g. the sensors TS1-TS4 are or comprise for instance analog sensors, such as force sensors, it is also possible to move in directions OD having other angles $\alpha$. The ratio between the force or pressure applied to one sensor and the other sensor then determines the value of angle $\alpha$.

Additionally, or alternatively, the sum or vector sum of the forces applied to the sensor or combination of sensors can be used to determine a setpoint, including snap (also known as jounce), jerk, acceleration, speed or distance of travel of the arrow MO on the display DI. For instance, the jerk can be determined using the yank, i.e. the rate of change of force.

In an embodiment, additional sensors are provided to determine the setpoint, e.g. a gyroscope and/or accelerometer.

In an embodiment, the gyroscope is used to determine an additional angle on the U, R, D and L sensors. Preferably, a relatively large rotational movement, rotational speed or rotational acceleration of the hand translates to a relatively small change of direction of the mouse cursor.

In an embodiment, an accelerometer can be used in combination with the set of U, R, D and L sensors. Preferably the accelerometer is configured for fine movement of the mouse cursor and the U, R, D and L sensors are configured for coarse movement of the mouse cursor. However, the opposite situation is also envisaged. Preferably, a relatively large change in velocity results in a relatively small change of velocity of the mouse cursor.

In an embodiment, Artificial Intelligence is used to determine a 2D interpretation of the 3D data presented by the gyroscope and/or accelerometer. E.g. using a correction later in the interaction as feedback for learning.

In an embodiment, a sensor can be assigned to boost the setpoint of the mouse cursor. This can be a digital sensor for a fixed boost factor or analog sensor for a variable boost factor. This may for instance be useful to quickly move the mouse over a larger surface. Alternatively, or additionally, a sensor can be assigned to soften the setpoint of the mouse cursor. This can be a digital sensor for a fixed boost factor or analog sensor for a variable softening factor. This may for instance be useful to accurately move the mouse over a smaller surface.

In an embodiment, the left hand and right hand can work together in determining a setpoint, wherein adding is the simplest form, and wherein one hand may for example have a larger weight than the other hand. In an embodiment, it is possible that the devices are configured such that when using one hand only, independent of which hand, the setpoint determination is fine and when using both hands, the setpoint determination is coarse. In another embodiment, it is possible that the devices are configured such that when using one hand only, the setpoint determination is fine, when using the other hand, the setpoint determination is coarse, and when using both hands, the setpoint determination is very coarse.

Using both hands can also be used to define more angles, e.g. pressing an L sensor with one hand and the U and L sensors with the other hand may allow an angle of 22.5 degrees. Using other combinations of sensors then allows to choose any angle n*22.5 degrees with n being an integer.

In an embodiment, a contribution of a sensor in relation to the setpoint determination can be configured individually for each sensor.

In an embodiment, the input data device comprises visual indication devices, e.g. using lights or a display, to indicate in which mode the data input device is.

Although the operating method and configurations of the data input device have been demonstrated using a data input device comprising an array of 3×4 sensors, it will be apparent to the skilled person that any data input device according to the invention can be used in a similar manner. The amount of sensors S, S' and TS1-TS4 that are provided will determine the exact way the data input device needs to be operated to provide the desired user input, but the basic principles of how this is done are the same.

Figure 12:
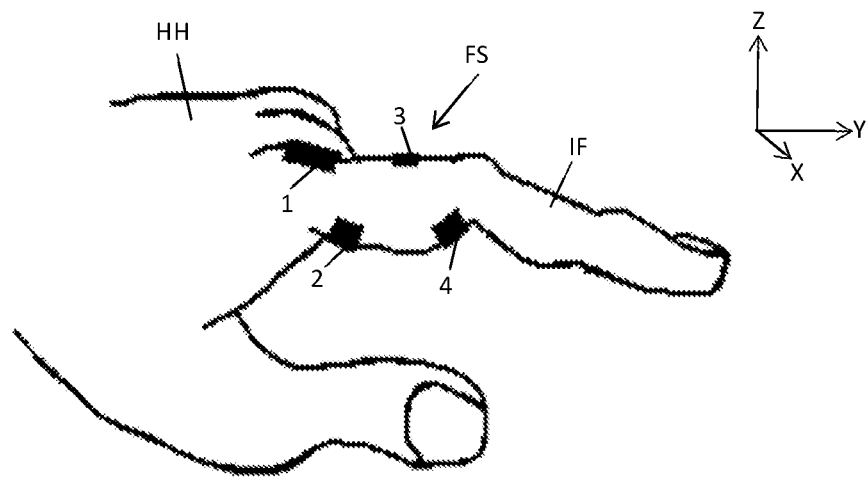
FIG. 12 schematically depicts a finger support of a wearable data input device according to a further embodiment of the invention.

FIG. 12 schematically depicts a finger support FS of a wearable data input device according to a further embodiment of the invention. The finger support FS in this embodiment comprises four ring segments 1, 2, 3 and 4 shown in FIG. 12 in engagement with an index finger IF of a human hand HH. The ring segments 1-4 may alternatively be referred to as engaging portions of the finger support FS. Although not shown, the four ring segments 1, 2, 3, 4 are rigidly connected to each other using associated connecting elements, alternatively called interconnecting portions, which connecting elements do not necessarily have to engage with the index finger IF.

The ring segments 1-4 are all configured to engage with a portion of the index finger IF corresponding to the proximal phalanges of the index finger IF. The regions on the index finger IF where the ring segments 1-4 engage with the index finger IF are referred to as first region, second region, third region and fourth region, respectively.

In the below description use will be made of the following symbols to describe relative movement between the finger portion and the finger:

X+: indicating a translation in positive X-direction;
X−: indicating a translation in negative X-direction;
rX+: indicating a rotation about the X-axis according to the right-hand-rule;

rX−: indicating a rotation about the X-axis according to the left-hand-rule;
Y+: indicating a translation in positive Y-direction;
Y−: indicating a translation in negative Y-direction;
rY+: indicating a rotation about the Y-axis according to the right-hand-rule;
rY−: indicating a rotation about the Y-axis according to the left-hand-rule;
Z+; indicating a translation in positive Z-direction;
Z−: indicating a translation in negative Z-direction;
rZ+: indicating a rotation about the Z-axis according to the right-hand-rule; and
rZ−: indicating a rotation about the Z-axis according to the left-hand-rule.

The right-hand-rule is a well-known rule in which the fingers of the right hand indicate the rotational direction when the thumb of the right hand is pointing in the direction of an arrow, vector or positive direction. In the corresponding left-hand-rule the fingers of the left hand indicate the rotational direction when the thumb of the left hand is pointing in the direction of an arrow, vector or positive direction.

The ring segments 1-4 are preferably curved and configured to engage the finger, such that the ring segments 1-4 cannot move relative to the index finger IF in X+ or X− direction. Ring segments 1 and 3 then prevent movement in Z+ direction while ring segments 2 and 4 prevent movement in Z− direction.

The ring segments 1 and 2 are in this embodiment configured to engage with the metacarpophalangeal joint or tissue nearby thereby allowing to prevent movement of the finger support in Y− direction. When the index finger is in its rest position, alternatively referred to as neutral position or position of function, the intermediate phalanges usually makes an angle with the proximal phalanges so that the ring segment 4 is prevented to move in Y+ direction keeping the finger support in place. Additionally, tissue in between the ring segments 2 and 3 may provide resistance to movement in the Y+ direction. When the intermediate phalanges is aligned with the proximal phalanges, this allows to remove the finger support in the Y+ direction.

The ring segments 1-4 or the corresponding interconnecting portions may also prevent any rotation in rX+, rX−, rZ+ and rZ− direction. Rotation in rY− direction may be prevented when the ring segment 1 is arranged sufficiently close to the metacarpophalangeal joint such that it engages with the neighbouring joint of the middle finger. Ring segment 2 may similarly be arranged close to the metacarpophalangeal joint such that it engages with the neighbouring joint of the middle finger to prevent movement in the rY+ direction. Alternatively, or additionally, using a plurality of similar finger supports for other fingers as well allows to prevent movement in the rY+ and rY− direction. Further, movement in the rY+ and rY− direction may be prevented due to the engagement between the proximal end side of the base and the hand or corresponding arm at a wrist side of the metacarpophalangeal joint.

One or more of the ring segments may be at least partially, possibly entirely, elastic to allow the finger support to adapt to the finger of the user and to allow an easy putting on and off of the finger support.

Figure 13A:
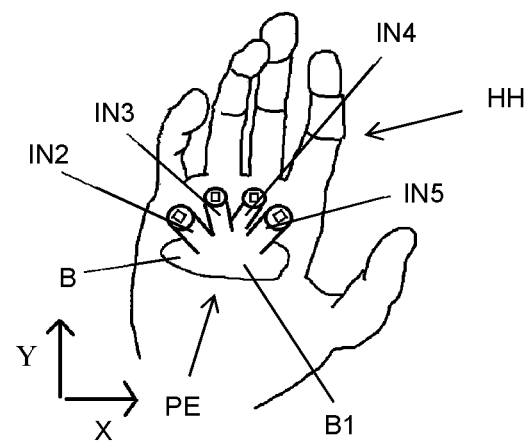
FIG. 13A schematically depicts a portion of a base of a wearable data input device according to yet another embodiment of the invention.
Figure 13B:
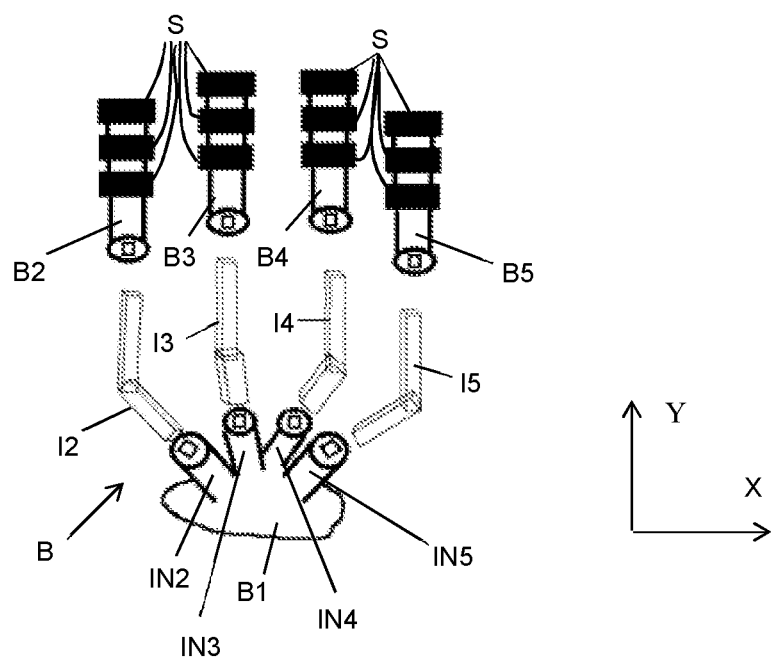
FIG. 13B schematically depicts the base of FIG. 13A with additional components.

FIGS. 13A and 13B depict a base B of a wearable data input device to be worn on a human hand HH. FIG. 13A depicts a portion of the base B and the orientation thereof with respect to the hand HH when in use, and FIG. 13B depicts the base B of FIG. 13A and additional components in exploded view.

The focus in FIGS. 13A and 13B is the base B of the data input device. Other parts of the input device will not be described in detail but may be similar to the already shown embodiments in FIGS. 1-12. Hence, not all features, e.g. the number of sensors and their spatial configuration, have to be similar.

The base B comprises a first member B1 forming a proximal end PE of the base B, wherein a proximal end side of the base, in this case formed by first member B1, is configured to engage with the hand HH at a wrist side of the metacarpophalangeal joint as shown in FIG. 13A.

The first member B1 is provided with respective interfaces IN2, IN3, IN4 and IN4.

FIG. 13B also depicts the first member B1, but now not in relation to the hand HH. Also shown are second member B2, third member B3, fourth member B4 and fifth member B5, in this embodiment each provided with three sensors S at a distal end side of the base B opposite to the proximal end PE of the base B.

Each member B2-B5 is connected to the interfaces IN2, IN3, IN4, IN5 of the first member B1 via a corresponding intermediate member 12, 13, 14 and 15. In this embodiment, each intermediate member 12-15 is moveably connected to the respective interface IN2, IN3, IN4, IN5 of the first member B1 and moveably connected to the respective member B2-B5, in this embodiment by being slidably received in the respective interface IN2, IN3, IN4, IN5 of the first member B1 and by being slidably received in the respective member B2-B5. It is also possible that one or more intermediate members 12-15 are only moveably connected at only one side.

In an embodiment, the position and/or orientation of an intermediate member 12-15 or a member B2-B5 can be temporarily fixed to prevent any further movement once an optimal position and/or orientation has been found.

In an embodiment, the four interfaces IN2, IN3, IN4, IN5 provide a position and direction that optimizes the positions of the sensors relative to the fingertips, e.g. an angle over rZ may optimize the position of the sensors to the movement direction of the fingertip, e.g. an angle over rY may optimize the individual positions of the sensors to the amount of rotation required from the interphalangeal joints of a finger.

In an embodiment, the four intermediate members 12-15 provide a position and direction that optimizes the positions of the sensors relative to the fingertips, e.g. an angle over rZ may optimize the position of the sensor to the movement direction of the fingertip, e.g. an angle over rY may optimize the individual positions of the sensors to the amount of rotation required from the interphalangeal joints of a finger.

In an embodiment, the portions of the intermediate members that are moveably connected to the interfaces IN2, IN3, IN4, IN5 of the first member B1 are arranged at an angle with the respective portions of the intermediate members that are moveably connected to the members B2-B5. This has the advantage that the arrangement of the intermediate member relative to the members B2-B5 sets a distance between respective member B2-B5 and the first member B1 and the arrangement of the intermediate member relative to the interface IN2, IN3, IN4, IN5 of the first member B1 implicitly sets a distance between the members B2-B5 in X-direction and thereby allowing to adjust the base B to the length and width of the hand HH and the corresponding fingers, so that the sensors S are properly positioned for the fingertips of the respective fingers. This way other configurations of the interfaces IN2-IN5 like the rotations over rX and rZ, if applicable, keep their benefits.

In an embodiment, although not shown, the first member B1 comprises one or more height adjuster to adjust the position of the members B2-B5 in a Z-direction (perpendicular to the X- and Y-directions). In case of one height adjuster, the position of all members B2-B5 may be adjusted simultaneously, while in another embodiment, the position of a member B2-B5 may be adjusted individually.

A similar mechanism as described may be used to configure the positions of the thumb sensors. However, as an alternative, the thumb sensors may be connected to an intermediate member 12 or 15, depending on the left- or right-hand applicability, or member B2 or B5, so that the thumb sensors are adjusted together with the sensors for the adjacent fingers.

As shown with respect to the above described embodiment, the distal end of the base B supporting the sensors may make an angle about 90-120 degrees, e.g. 110 degrees relative to the palm of the hand, which in this embodiment is in contact with the proximal end of the base. However, the proximal end of the base does not necessarily have to be in contact with the palm of the hand, and the angle between the palm of the hand and the distal end of the base can also be much smaller. Further, the proximal end is not necessarily an elongation of the distal end.

Although the invention describes wearable data input devices in general to send data to an external device in general, the invention, whether being the first, second, third, fourth, or any combination thereof, is especially suitable to the situation in which the main function of the wearable data input device is to translate user input into data and send the data to an external device. Data input devices that have such a main function include a game console, keyboard and mouse. The use of such data input devices without the external device may be very limited. Such data input devices may also be referred to as peripheral devices used to input information to an external device, e.g. a computer.

The invention claimed is:

1. A wearable data input device (ID) to be worn on a human hand (HH), comprising:
    a base (B) comprising a proximal end (PE) and a distal end (DE) opposite to the proximal end;
    a finger support (FS) to receive a portion of a finger of the hand corresponding to the proximal phalanges in order to allow the corresponding finger portion to carry the wearable data input device, and
    at least one sensor (S1, S2, S3; S) arranged at the distal end of the base to interact with fingertips of the hand to allow user input,
    wherein the finger support is rotatably connected to the base to rotate about a rotation axis (RA), which rotation axis is arranged to be substantially aligned with the metacarpophalangeal joint of the corresponding finger when said finger portion is received in the finger support,
    and wherein the input device further comprises an output unit (OU) to send data corresponding to the user input to an external device,
    wherein a center of gravity of the base is located at a distal end side of the rotation axis.

2. The input device according to claim 1, wherein the at least one sensor includes a set of sensors (S1, S2, S3; S).

3. The input device according to claim 2, wherein the set of sensors comprises an array of four columns and three rows of sensors, wherein the columns extend in a direction substantially parallel to the fingers and the rows extend perpendicular thereto.

4. The input device according to claim 1, wherein the finger support is a first finger support to receive a portion of a first finger and the rotation axis is a first rotation axis, wherein the input device further comprises a second finger support to receive a portion of a second finger of the hand corresponding to the proximal phalanges, such that when the portion of the second finger is received in the second finger support an orientation of the second finger support follows the orientation of the portion of the second finger, and wherein the second finger support is rotatably connected to the base to rotate about a second rotation axis, which second rotation axis is arranged to be substantially aligned with the metacarpophalangeal joint of the corresponding second finger when the portion of the second finger is received in the second finger support.

5. The input device according to claim 4, wherein the first finger support is configured for the index finger and the second finger support is configured for the ring finger or the little finger.

6. The input device according to claim 1, wherein the at least one sensor also includes at least one sensor configured to interact with the thumb of the hand.

7. The input device according to claim 6, wherein the at least one sensor comprises two or more thumb sensors to be arranged around the thumb such that interaction between the thumb and one of the thumb sensors is possible for two or more different directions of the thumb relative to the hand.

8. The input device according to claim 1, wherein the finger support is configured to engage with the corresponding finger portion at the following locations:
    a first region at a dorsal side of said finger portion; and
    a second region at a palmar side of said finger portion.

9. The input device according to claim 8, wherein the finger support has a ring-like shape.

10. The input device according to claim 8, wherein the first region and the second region are connected to each other at one or both lateral sides of the corresponding finger portion in between the dorsal and palmar sides of the corresponding finger portions.

11. The input device according to claim 10, wherein at least one connection at the lateral sides is absent.

12. The input device according to claim 1, wherein the finger support is configured to only engage with the corresponding finger portion at the following locations:
    a third region at the dorsal side of said finger portion; and
    a fourth region at the palmar side of said finger portion.

13. The input device according to claim 12, wherein the finger support has a ring-like shape.

14. The input device according to claim 12, wherein the third region and the fourth region are connected to each other at one or both lateral sides of the corresponding finger portion in between the dorsal and palmar sides of the corresponding finger portions.

15. The input device according to claim 14, wherein at least one connection at the lateral sides is absent.

16. The input device according to claim 1, wherein a side at the proximal end of the base is configured to engage with the hand or corresponding arm at a wrist side of the metacarpophalangeal joint.

17. The input device according to claim 1, comprising sensors to measure movement of the device as a whole.

18. The input device according to claim 17, wherein a gyroscope and accelerometer are provided to determine a setpoint of a mouse pointer.

19. The input device according to claim 1, wherein the base comprises a step-like shape or a concave shape.

20. A combination of a first wearable data input device (ID) and a second wearable data input device (ID), wherein both the first and second input devices comprise:
- a base (B) comprising a proximal end (PE) and a distal end (DE) opposite to the proximal end;
- a finger support (FS) to receive a portion of a finger of the hand corresponding to the proximal phalanges in order to allow the corresponding finger portion to carry the wearable data input device, and
- at least one sensor (S1, S2, S3; S) arranged at the distal end of the base to interact with fingertips of the hand to allow user input,
- wherein the finger support is rotatably connected to the base to rotate about a rotation axis (RA), which rotation axis is arranged to be substantially aligned with the metacarpophalangeal joint of the corresponding finger when said finger portion is received in the finger support,
- and wherein the input device further comprises an output unit (OU) to send data corresponding to the user input to an external device,
- wherein the first input device is configured for a left hand, and wherein the second input device is configured for a right hand, and
- wherein the output unit of one of the first and second input device is configured to send data corresponding to the user input to the output unit of the other one of the first and second input device, and the output unit of the other one of the first and second input device is configured to send data corresponding to the user input of the first input device and data corresponding to the user input of the second input device to an external device.

21. An operating method of a wearable data input device, wherein the wearable data input device includes a set of sensors to interact with fingertips of the hand to allow user input, and an output unit to send data corresponding to the user input to an external device, and wherein the method comprises the following steps:
a) assigning all sensors a corresponding predetermined input function;
b) providing user input in accordance with the assigned input functions;
c) changing the assignment of the sensors by assigning at least one sensor another predetermined input function; and
d) providing user input in accordance with the changed assigned input functions, and wherein the data input device is operated in one or more of the following modes:
- a keyboard mode in which at least some of the sensors have been assigned keys on a standard keyboard
- an arrow mode in which at least some of the sensors have been assigned four different moving directions;
- a mouse mode in which at least some of the sensors have been assigned four different moving direction and a click functionality; and
- a device mode in which at least some of the sensors have been assigned device specific input functions, and
- wherein the set of sensors comprises at least one sensor configured to interact with the thumb of the hand, wherein the at least one sensor configured to interact with the thumb is used to provide a direction as user input for a cursor or mouse pointer or a direction of change on a keyboard, wherein in keyboard mode, interaction with the at least one sensor configured to interact with the thumb determines a direction of change of assignment of at least some of the sensors on the standard keyboard, and wherein in keyboard mode, interaction with the at least one sensor configured to interact with the thumb preferably determines the number of shifts of assignment in the direction of change of at least some of the sensors on the standard keyboard.

22. An operating method according to claim 21, wherein each sensor arranged to interact with one of the fingers is assigned a different letter or key from a computer keyboard, wherein changing the assignment means that at least one sensor is assigned a different letter or key.

23. An operating method according to claim 21, wherein the change of assignment is caused by operating a separate sensor or by operating a predetermined combination or sequence of sensors.

24. An operating method according to claim 21, wherein the set of sensors includes at least one sensor configured to interact with the thumb of the hand, and wherein the at least one sensor configured to interact with the thumb is used to provide a direction as user input.

25. An operating method according to claim 24, wherein the set of sensors comprises two or more thumb sensors to be arranged around the thumb such that interaction between thumb and one of the thumb sensors is possible for two or more different directions of the thumb relative to the hand.

26. An operating method according to claim 21, wherein the data input device switches from one mode to another mode.

27. An operating method according to claim 21, wherein changing the assignment is caused by operating a separate sensor, e.g. using the thumb, or by operating a predetermined combination of sensors.

* * * * *